UNITED STATES PATENT OFFICE.

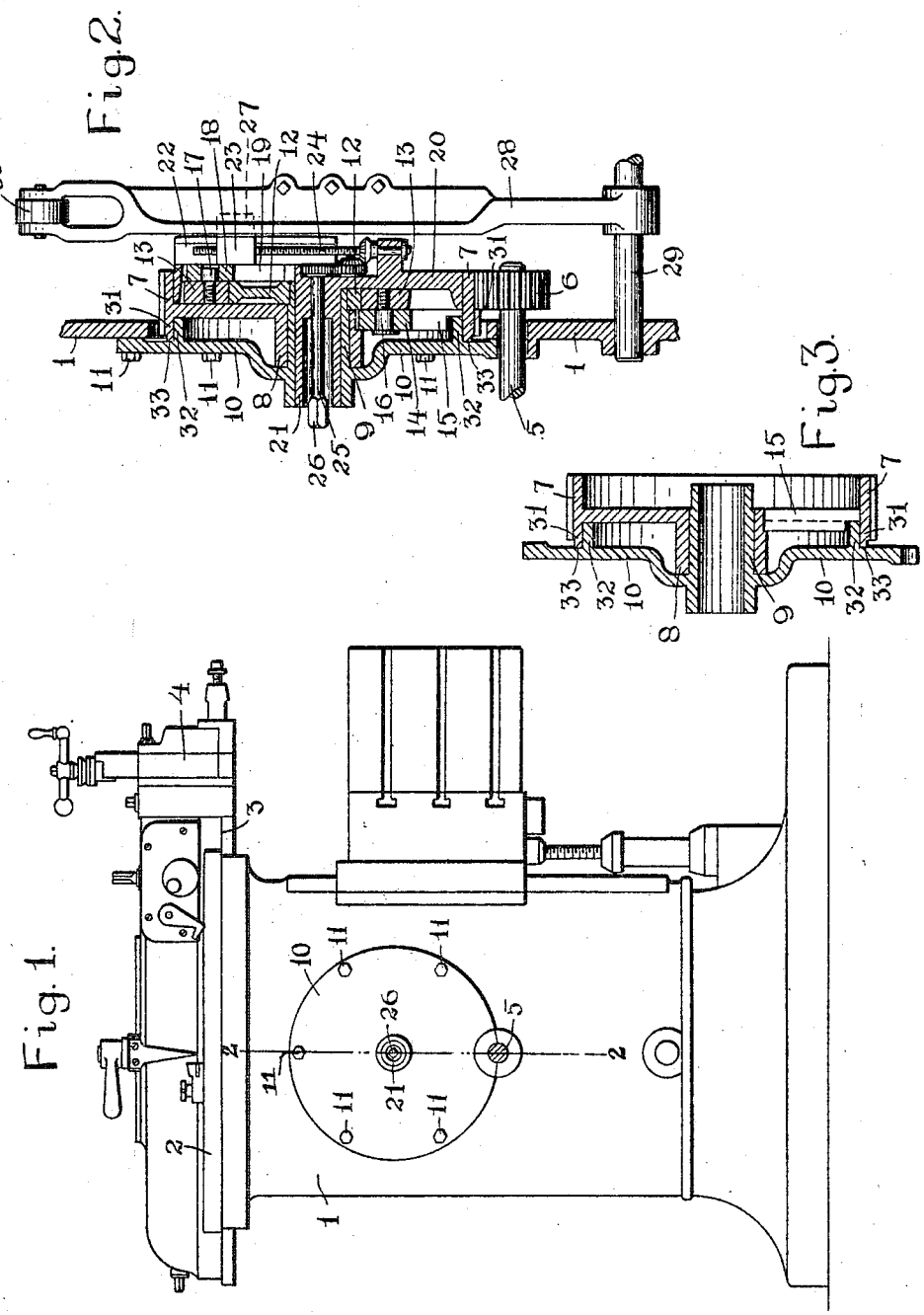

RADFORD STOCKBRIDGE, OF WORCESTER, MASSACHUSETTS, ASSIGNOR OF ONE-HALF TO ARTHUR W. BEAMAN, OF WORCESTER, MASSACHUSETTS.

VARIABLE-SPEED DRIVING MECHANISM.

979,589.  Specification of Letters Patent.  Patented Dec. 27, 1910.

Application filed April 28, 1906. Serial No. 314,281.

*To all whom it may concern:*

Be it known that I, RADFORD STOCKBRIDGE, a citizen of the United States, residing at Worcester, in the county of Worcester and Commonwealth of Massachusetts, have invented a new and useful Improvement in Variable-Speed Driving Mechanism, of which the following is a specification, accompanied by drawings forming a part of the same and representing my variable-speed mechanism as applied to a metal-shaping machine, in which—

Figure 1 represents a side view of a shaping machine embodying my invention. Fig. 2 represents a variable pitman with its actuating mechanism shown in central vertical sectional view, the section being taken through the portion of the shaping machine on line 2—2, Fig. 1, and Fig. 3 is a detached and sectional view of the circular plate 10 and rotating gear 7.

Similar reference letters and figures refer to similar parts in the different views.

My present invention has for its object to increase the durability, rigidity, and accuracy of the operation of that class of variable speed mechanisms which form the subject of the United States Patent No. 807,216 issued to me December 12, 1905, and to which reference may be had for a fuller description of the operative parts of the mechanism.

Referring to the accompanying drawings 1 denotes the supporting framework provided at the top with horizontal ways 2 for a reciprocating ram 3, having a head 4 to carry the cutting tool, these parts being substantially the same as in machines of this class now in common use. Power is applied to a driving shaft 5 by means of a cone pulley attached to the shaft 5, but which has been removed in the accompanying drawings. Upon the inner end of the shaft 5 is attached a pinion 6 which engages a gear 7 provided with a hub 8 which rotates upon the outside of a fixed hub 9 which is integral with a circular plate 10. The circular plate 10 is attached to the framework of the machine by bolts 11.

Rigidly attached to the inside of the fixed hub 9 is an eccentric 12, having an eccentric ring 13 rotated around the fixed eccentric 12 by means of a sliding block 14, capable of a sliding motion in ways 15 in the gear 7, and pivotally connected with the eccentric ring 13 by means of a stud 16. The eccentric ring carries a stud 17 upon which is pivotally mounted a sliding block 18, capable of a radial sliding movement in a slot 19 in a crank plate 20. The crank plate 20 is provided with a long hub 21 which is journaled within the fixed hub 9. The crank plate 20 is also provided with radial ways 22 in which is held a block 23, provided with means for its radial adjustment in ways 22, comprising a screw 24 connected by suitable gearing with a spindle 25 journaled in the hub 21 of the crank plate and extending outside the machine, with its outer end 26 adapted to receive a wrench. The sliding block 23 is pivotally connected with a block 27 capable of sliding in vertical ways in a variable pitman 28, pivoted at its lower end upon a stud 29 held in the framework of the machine, and provided at its upper end with a friction roll 30 which engages the reciprocating ram 3.

The construction and operation of the operative mechanism above described by which a swinging motion is imparted to the variable pitman 28 is the same as that described in the United States Patent No. 807,216, issued to me December 12, 1905.

By my present improvement the gear 7 is provided, on the side next the framework of the machine, with an annular flange 31, having its inner surface finished concentrically with its axis of rotation, and the plate 10 is enlarged in size so that its diameter exceeds the diameter of the gear 7, and it is provided with an annular flange 32 having its outer surface finished concentrically with the axis of the fixed hub 9 to form a bearing for the flange 31. The edge 33 of the annular flange 31 bears against the inner surface of the circular plate 10. The gear 7 is thereby provided with a bearing surface at or near its periphery, both upon the side of the flange 31 to resist any longitudinal thrust against the gear wheel, but it also has a concentric bearing formed by the flanges 31 and 32 which relieves the journal bearing between the hub 8 of the gear and the fixed hub 9 of the framework, thereby insuring, notwithstanding its continued use and wear, a true concentric bearing surface for the gear 7, thereby securing accuracy of movement of the operative parts which obviates any cramping or binding of the same, but it also decreases the friction and adds to the ease of operation and durability of the parts.

The circular plate 10 is provided also with a plane surface at its periphery in contact with a plane surface on the framework, and the plane surfaces are attached by the bolts 11. This insures the accurate adjustment of the plate 10 and, in combination with the concentric bearing surfaces upon the plate 10 and the gear 7, provides for the accurate relation of the gear 7, eccentric 12 and its eccentric ring 13 and crank plate 20, and for their rotation without binding or excessive friction. The plane surfaces upon the plate 10 and the framework are finished to be parallel and to provide an accurate fit, so that the correct position of the plate 10 and its attached parts is obtained with reference to the gear 7 and the rotating parts connected with it, and all cramping or binding is obviated.

I claim,

In a mechanism of the class described, a framework having an opening in its side, a circular plate attached to the framework and covering said opening, provided with a hollow hub and a concentric interior flange, a gear journaled on said hub and said concentric flange, a driving shaft passing through the edge of said circular plate, and a pinion carried on said shaft engaging said gear.

Dated this 21st day of April 1906.

RADFORD STOCKBRIDGE.

Witnesses:
 RUFUS B. FOWLER,
 PENELOPE COMBERBACH.